United States Patent
Menegoli

[19]

[11] Patent Number: 5,923,133
[45] Date of Patent: Jul. 13, 1999

[54] ADAPTIVE SLEW RATE ADJUSTMENT FOR A BRUSHLESS MULTIPHASE DC MOTOR AND METHOD

[75] Inventor: Paolo Menegoli, Milpitas, Calif.

[73] Assignee: STMicroelectronics, Inc., Carrollton, Tex.

[21] Appl. No.: 08/865,640

[22] Filed: May 30, 1997

Related U.S. Application Data

[51] Int. Cl.[6] ............................................. H02P 7/00
[52] U.S. Cl. ................................... 318/254; 318/439
[58] Field of Search ................................. 318/254, 439, 318/138; 388/811, 813, 815, 822; 327/140

[56] References Cited

U.S. PATENT DOCUMENTS

| | | | |
|---|---|---|---|
| 3,569,805 | 3/1971 | Hammond | 318/811 |
| 4,333,042 | 6/1982 | Kawada et al. | 318/811 |
| 4,409,535 | 10/1983 | Hickman | 318/811 |
| 4,743,815 | 5/1988 | Gee et al. | 318/254 |
| 5,157,351 | 10/1992 | Carobolante | 330/277 |
| 5,241,247 | 8/1993 | Salerno et al. | 318/254 |
| 5,397,967 | 3/1995 | Carobolante et al. | 318/254 |
| 5,493,189 | 2/1996 | Ling et al. | 318/254 |
| 5,550,446 | 8/1996 | Schlager et al. | 318/439 |
| 5,589,744 | 12/1996 | Brambilla | 318/254 |
| 5,614,797 | 3/1997 | Carobolante | 318/432 |
| 5,625,264 | 4/1997 | Yoon | 318/254 |

Primary Examiner—Jonathan Salata
Attorney, Agent, or Firm—David V. Carlson; Theodore E. Galanthay; Lisa K. Jorgenson

[57] ABSTRACT

A set of circuits for controlling the slew rate of a driving transistor in a rotating three-phase DC motor having a "Y" configuration of coils. The slew rate is reduced when the rotational speed of the motor is low. The slew rate is controlled by controlling the voltage applied to a control terminal of the driving transistor. The voltage applied to the control terminal of the driving transistor is selected in response to a control signal that is indicative of the speed of the motor.

30 Claims, 7 Drawing Sheets

5,923,133

ADAPTIVE SLEW RATE ADJUSTMENT FOR A BRUSHLESS MULTIPHASE DC MOTOR AND METHOD

TECHNICAL FIELD

This invention relates to the operation of a polyphase DC motor, and more particularly, to a method and a circuit for controlling the slew rate of a driving transistor in a DC motor.

BACKGROUND OF THE INVENTION

Polyphase DC motors, and more particularly three-phase DC motors of the brushless, sensorless type, are widely used in computer system disk drives, such as floppy disk, hard disk, or CD ROM drives, as well as in other applications. Three-phase DC motors may be modeled as having a stator with three coils connected in a "Y" configuration, although typically a larger number of stator coils are employed with multiple motor poles. In conventional applications, eight pole motors are used having twelve stator windings, or coils, and four N-S magnetic sets on a rotor. The twelve stator coils are modeled in terms of four groups of coils, each group being arranged as a set of three "Y" connected coils. One end of each of the three coils in the "Y" configuration is joined to a common node, or a center tap, and the opposite end of each coil is connected between a high side driving transistor and a low side driving transistor. The center tap may be left unconnected, or it may be connected to a controlled voltage source.

A three-phase DC motor is typically operated in a bipolar mode which can be summarized as follows. The three "Y" connected coils are energized in a sequence of patterns or pathways of current to drive the rotor. In each pattern a current path is established through two of the three coils. The third coil in the "Y" configuration is left floating, or, in other words, no current is permitted to flow through the coil.

Current flow through each of the "Y" connected coils is controlled by the driving transistors. Current flows in one of the three "Y" connected coils when either its high side driving transistor or its low side driving transistor is energized to conduct the current. In each pattern current flows through a high side driving transistor and its associated coil, through the center tap, and then through a second coil and its low side driving transistor. The sequence of current pathways is chosen so that, as the current path is changed, one of the coils in the current path is switched to a floating condition, and the previously floating coil is switched into the current path. In the "Y" configuration of three coils a total of six different current paths are available to drive the rotor. A commutation occurs each time the current path through the coils is changed, and the position of the rotor at that moment is a commutation point. In the sequence defined above, six different commutation events occur for each full rotation of the rotor in the three-phase DC motor.

Precise control of the rotational motion of the rotor in the three-phase DC motor is important in disk drive systems. Inadequate control of the rotor's motion can result in unwanted vibrations and acoustic noise. The motion of the rotor is controlled by choosing the commutation points in a precise and consistent manner. An optimum commutation point is selected based on the position of the rotor, which is typically ascertained by monitoring a back EMF signal in the motor, also called the BEMF signal, which is the EMF induced in the floating coil by the rotating magnetic field of the rotor.

The BEMF signal in the floating coil is sinusoidal in nature, and crosses the voltage of the center tap at regular intervals. The BEMF signal may be used to determine the rotational speed of the rotor. As the rotor speed increases, the frequency of the BEMF signal increases. As the rotor speed decreases, the frequency of the BEMF signal decreases. The BEMF voltage signal is also used to select the commutation points. Conventionally, optimum commutation points are chosen in relation to the moments in which the BEMF signal equals the center tap voltage, and these moments are zero crossing points. When the motor is functioning properly the position of the rotor is known at each zero crossing point.

Typically, the driving transistors in a three-phase "Y" connected DC motor are n-channel DMOS transistors having a gate, a drain, and a source. The gate is a control terminal for the n-channel DMOS transistor. An n-channel DMOS driving transistor is switched ON to direct current through a coil by raising the voltage on its gate. Conversely, the driving transistor is switched OFF by reducing the voltage applied to its gate. As the n-channel DMOS driving transistor is switched ON by increasing the voltage on the gate, current begins to flow through the transistor and reaches a plateau before the voltage applied to the gate reaches a maximum. The faster the voltage on the control terminal is raised to a maximum, the faster the driving transistor is switched ON and the faster the current in the coil rises to the plateau. Conversely, when the n-channel DMOS driving transistor is being switched OFF the voltage on the gate is reduced until no current is flowing through the transistor or the coil. The faster the voltage is reduced on the gate the faster the driving transistor stops the current flow. The rate of change of voltage at the point of connection between the driving transistor and the coil is directly related to the rate of change of current through the coil, and is referred to as the slew rate. The slew rate is governed by the voltage applied to the gate of the driving transistor.

When the rotor of the DC motor is rotating at or near a desired speed and the BEMF signal has a high frequency, a moderate amount of current is circulated through the coils to apply sufficient torque to maintain the speed of the rotor. However, during a start-up procedure the rotor is rotating at a slow speed and is generating a low frequency BEMF signal. During this period, the rotor is being accelerated by the coils which draw substantially more current than is required to merely maintain the speed of the rotor. The high current through the coils, also called high current recirculation, has a negative effect on the operation of the motor, particularly during commutation events involving the low side driving transistors. When a first low side driving transistor is being switched OFF to stop current in a first coil, a second low side driving transistor is being switched ON to allow current to flow in a second coil. When the first low side driving transistor is switched OFF rapidly, acoustic noise is generated from transient disruptions in the current through the coils for the following reason. The current through the second coil increases slowly due to a slow time constant in a control loop for the coil, and when the first low side driving transistor is switched OFF rapidly, the total current through the coils decreases slightly until a maximum current is reached in the second coil. The transient decrease in current through the coils, which is of particular significance during periods of high current recirculation, causes audible noise which is highly undesirable in disk drive systems.

Careful control of the slew rate of the driving transistors reduces high frequency harmonic noise which is generated when the driving transistors are switched ON and OFF. Harmonic noise is generated over a wide band of frequencies if the driving transistors are switched ON and OFF too rapidly, and the noise may interfere with a channel transferring data to or from the disk during a write or a read operation. A reduction in the slew rate reduces the band of frequencies over which the harmonic noise is generated, thereby eliminating interference with the read or write operations.

In conventional three-phase DC motors a constant slew rate is employed regardless of the operating conditions of the motor which results in the generation of undesirable noise. A need remains for a method and an apparatus to reduce unwanted audible noise in a three-phase DC motor.

SUMMARY OF THE INVENTION

A preferred embodiment of the present invention is directed to an adaptive slew rate control circuit for controlling a slew rate of a driving transistor having a control terminal, the driving transistor being coupled to a polyphase DC motor. The control circuit includes a current control circuit providing a first control current based on a control signal, the control signal being indicative of the speed of the motor. A transfer circuit is coupled to the current control circuit and to the control terminal of the driving transistor. The transfer circuit provides a control voltage to the control terminal of the driving transistor, the control voltage being based on the first control current. The slew rate of the driving transistor is controlled by the control voltage based on the speed of the motor.

Another preferred embodiment of the present invention is directed to a method for controlling a slew rate of a driving transistor coupled to a polyphase DC motor, the motor rotating at a speed, and the driving transistor having a control terminal. The method includes the following steps. A control signal having a voltage indicative of the speed of the motor is generated. A control current is generated in response to the control signal. The control current is translated into a control voltage. The control voltage is coupled to the control terminal of the driving transistor such that the slew rate of the driving transistor is controlled by the control voltage.

DETAILED DESCRIPTION OF THE INVENTION

Figure 1:
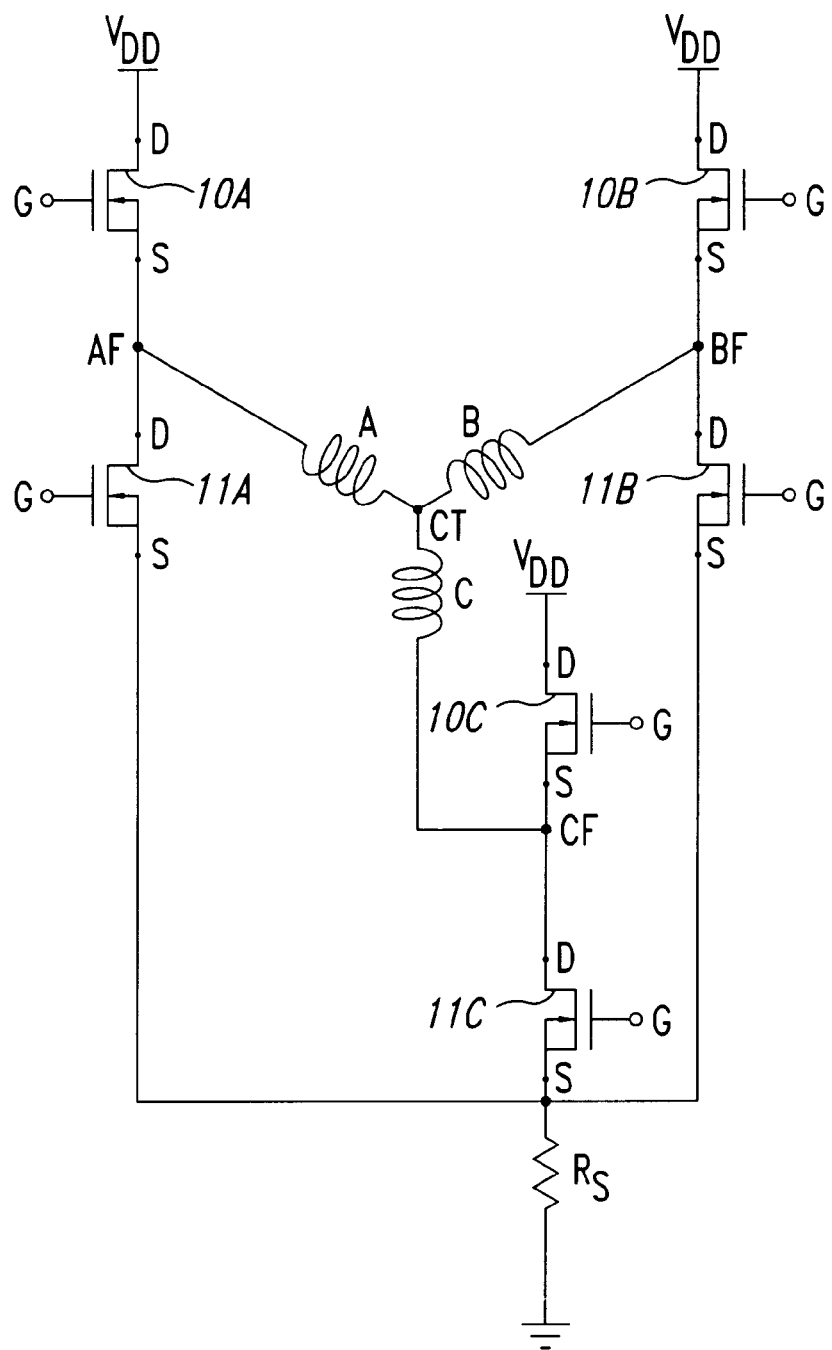
FIG. 1 is an electrical schematic diagram of a three-phase DC motor according to the prior art.

A conventional three-phase DC motor having a "Y" configuration of three coils A, B, and C is shown schematically in FIG. 1. The coils A, B, and C are connected to each other at a center tap CT. Each coil is driven by a pair of n-channel DMOS driving transistors: a low side driving transistor and a high side driving transistor. One end, denoted as AF, of the first coil A is connected to a source S of a first high side driving transistor 10A and to a drain D of a first low side driving transistor 11A. One end, denoted as BF, of the second coil B is similarly connected to a source S of a second high side driving transistor 10B and to a drain D of a second low side driving transistor 11B. Finally, one end, denoted as CF, of the third coil C is connected to a source S of a third high side driving transistor 10C and to a drain D of a third low side driving transistor 11C. The drains D of each of the high side driving transistors 10A, 10B and 10C are connected to a voltage source VDD, and the sources S of each of the low side driving transistors 11A, 11B, and 11C are connected to a first end of a sense resistor $R_s$. A second end of the sense resistor $R_s$ is connected to a ground voltage reference such that all of the current flowing through the "Y" connected coils passes through the sense resistor $R_s$ to the ground voltage reference.

Each of the driving transistors 10A, 10B, 10C, 11A, 11B, and 11C includes a gate G in addition to the drain D and source S discussed above. In a typical driving transistor current flows from the drain D to the source S when a voltage applied to the gate G is greater than the voltage at the source S by a threshold voltage amount. The path between the drain D and the source S provides some resistance which must be overcome by a positive voltage difference in order for the current to flow from the drain D to the source S.

In a typical driving transistor of a three-phase DC motor, the voltage at the drain D exceeds the voltage at the source S by an amount sufficient to push current through the driving transistor and its associated coil when the gate G is energized. To switch ON the driving transistor, the voltage on the gate G is raised to a level exceeding the voltage of the source S by a threshold voltage amount, which causes a small amount of current to flow from the drain D to the source S. The voltage applied to the gate G is usually raised further to a maximum level of two or three times the threshold voltage amount in excess of the voltage at the source S. The current from the drain D to the source S rises with the voltage applied to the gate G and reaches a plateau before the voltage on the gate G stops rising. The rate of increase in current flow through the driving transistor depends on the rate of increase in the voltage applied to the gate G. In addition, the rate of change of the voltage at the connection between the driving transistor and its associated coil in the three-phase DC motor (i.e., the slew rate of the driving transistor) is also governed by the rate of change of voltage on the gate G of the driving transistor.

When one of the driving transistors 10A, 10B, 10C, 11A, 11B, or 11C is switched ON, it will conduct current and become part of a current path through the two or more coils in the motor. For example, in a representative phase of operation, current flows from the voltage source VDD through the first high side driving transistor 10A, the first coil A, the center tap CT, the second coil B, the second low side driving transistor 11B, and the sense resistor $R_s$ to the ground voltage reference. This particular phase is chosen by pulling the voltages high on the gates of the driving transistors 10A and 11B while keeping the voltages low on the gates of the other four driving transistors. A commutation may be carried out to change the current path by bringing one of the gates from a high to a low voltage level while simultaneously pulling another of the gates from a low to a high voltage level.

As described above, when the rotational speed of the rotor is low and the rotor is being accelerated, the "Y" connected coils draw a large amount of current. The high current recirculation through the coils creates an environment where switching the driving transistors ON and OFF rapidly results in undesirable acoustic noise. One way to minimize this noise is to reduce the slew rate when the driving transistors are switched ON or OFF during a low speed operation of the motor. Reducing the slew rate of one of the low side driving transistors when it is being switched OFF is particularly effective at reducing such acoustic noise. That is because the current through the coil coupled to the low side driving transistor being switched ON raises more slowly, due to a slow time constant in a control loop for the coil, than the current reduces through the coil coupled to the low side driving transistor being switched OFF. If the slew rate of the low side driving transistor being switched OFF is not reduced, the total current in the coils would temporarily drop and thereby cause acoustic noise.

Figure 2:
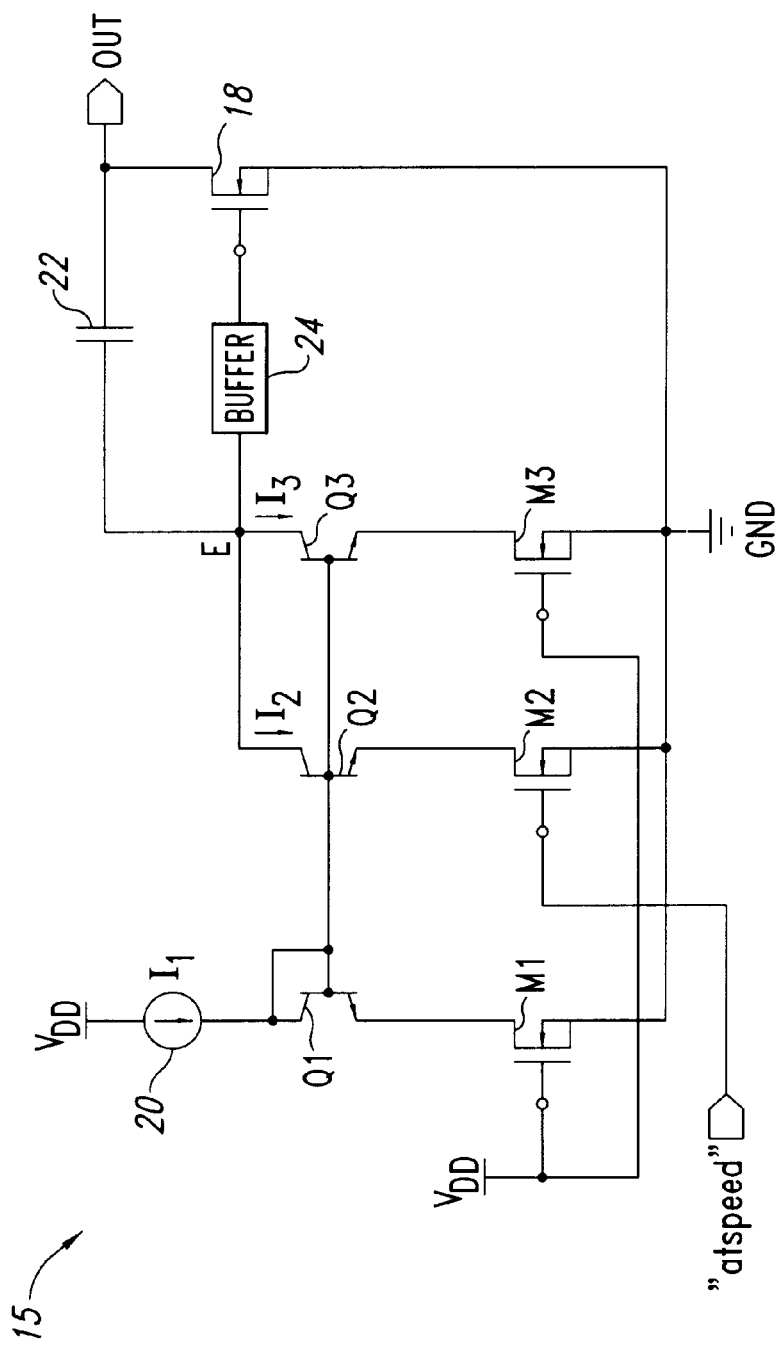
FIG. 2 is an electrical schematic diagram of a circuit for reducing a voltage applied to a control terminal of a low side driving transistor according to a first embodiment of the invention.

A control circuit 15 for controlling the slew rate of an n-channel DMOS low side driving transistor 18 according to a first embodiment of the invention is shown in FIG. 2. The control circuit 15 controls the rate at which voltage is reduced on a gate of the driving transistor 18 when the driving transistor 18 is being switched OFF. A current source 20 providing a current $I_1$ is connected between a voltage source VDD and a collector of an NPN transistor Q1. An emitter of the transistor Q1 is connected to a drain of an n-channel MOS transistor M1. A base of the transistor Q1 is connected to the collector of the transistor Q1, a base of an NPN transistor Q2, and a base of an NPN transistor Q3. An emitter of the transistor Q2 is connected to a drain of an n-channel MOS transistor M2 and an emitter of the transistor Q3 is connected to a drain of an n-channel MOS transistor M3. A source of each of the transistors M1, M2, M3 is connected to a ground voltage reference. A gate of the transistor M1 and a gate of the transistor M3 are both connected to the voltage source VDD. A gate of the transistor M2 receives an "atspeed" control signal.

A collector of the transistor Q3 is connected to a collector of the transistor Q2 at a node E, and the node E is connected to a first plate of a capacitor 22 and to an input of a buffer circuit 24. The buffer circuit 24 may be any well-known buffer circuit having a high input impedance and a low output impedance such as an emitter follower circuit or an operational amplifier circuit. An output of the buffer circuit 24 is connected to the gate of the driving transistor 18. A drain of the driving transistor 18 and a second plate of the capacitor 22 are connected to an output terminal OUT which is a point of connection for one end of a coil associated with the driving transistor 18 when the driving transistor 18 is incorporated into a motor circuit such as the three-phase DC motor shown in FIG. 1. A source of the driving transistor 18 is connected to the ground voltage reference. The buffer circuit 24 and the capacitor 22 insulate the driving transistor 18 from the rest of the control circuit 15. Current flowing through the "Y" connected coils flows to the ground voltage reference through the terminal OUT and the driving transistor 18 when the driving transistor 18 is switched ON.

The operation of the control circuit 15 shown in FIG. 2 will now be described. The transistors M1, M2, and M3 are switch transistors which control current flow through the transistors Q1, Q2, and Q3, respectively. The gates of the transistors M1 and M3 are connected to the voltage source VDD such that both of the transistors M1 and M3 are always in a conducting state. The gate of the transistor M2 is connected to the "atspeed" control signal, which is a digital signal indicating the speed of the rotor. When the speed of the rotor is below a threshold speed, the "atspeed" control signal is low and the transistor M2 is switched OFF. When the speed of the rotor exceeds the threshold speed, the "atspeed" control signal is pulled high and the transistor M2 is switched ON which causes current to begin to flow through the transistors Q2 and M2.

The current $I_1$ generated by the current source 20 flows through the transistors Q1 and M1 to the ground voltage reference. The coupling between the transistors Q1 and Q3 forms a current mirror circuit such that a current $I_3$, equal to the current $I_1$, is drawn from the node E by the transistor Q3. The current $I_3$ is drawn from the first plate of the capacitor 22. A voltage is applied to the gate of the driving transistor 18 by the buffer circuit 24 which is equal to a voltage at the node E. The current $I_3$ drawn from the capacitor 22 reduces the voltage at the node E which reduces the voltage on the gate of the driving transistor 18. As long as the speed of the rotor is below the threshold speed, the "atspeed" control signal is low which keeps the transistors M2 and Q2 from conducting current. As such, the voltage at the gate of the driving transistor 18 is reduced according to the current $I_3$. As a result, the control circuit 15 provides a slew rate for the low side driving transistor 18 that is governed by the current $I_3$ when the rotor is rotating slowly.

As the speed of the rotor increases beyond the threshold speed, the "atspeed" control signal is shifted from a low to a high value, which causes the transistor M2 to switch ON. Switching ON the transistor M2 allows a current $I_2$ to be drawn from the node E by the transistors Q2 and M2 to the ground voltage reference. The transistor Q2 is coupled to the transistor Q1 to form a second mirror circuit when the transistor M2 is conducting. The current $I_2$ is therefore equal to the current $I_1$ when the transistor M2 is switched ON. When the transistors M2 and M3 are both conducting, the transistors Q2 and Q3 draw the currents $I_2$ and $I_3$, respectively, from the capacitor 22 through the node E. The voltage at the gate of the driving transistor 18 is reduced by the buffer circuit 24 according to the sum of the currents $I_2$ and $I_3$. The slew rate of the driving transistor 18 is thereby approximately doubled when the rotor speed exceeds the threshold speed and there is a moderate flow of current through the coils. In this way, the control circuit 15 controls the slew rate of the low side driving transistor in response to the speed of the rotor, and the slew rate is reduced during a period of high current recirculation through the coils.

In the circuit shown in FIG. 2 the dimensions of the transistors Q1, Q2, and Q3 are identical such that the currents $I_1$, $I_2$, and $I_3$ are equal when the transistor M2 is switched ON. In an alternative embodiment the transistors Q2 and Q3 may be sized differently such that the current $I_2$ would be either greater or lesser than the current $I_3$. The transistors Q1, Q2, and Q3 may be designed in such a way as to tailor the slew rate to match the characteristics of the motor.

Figure 3:
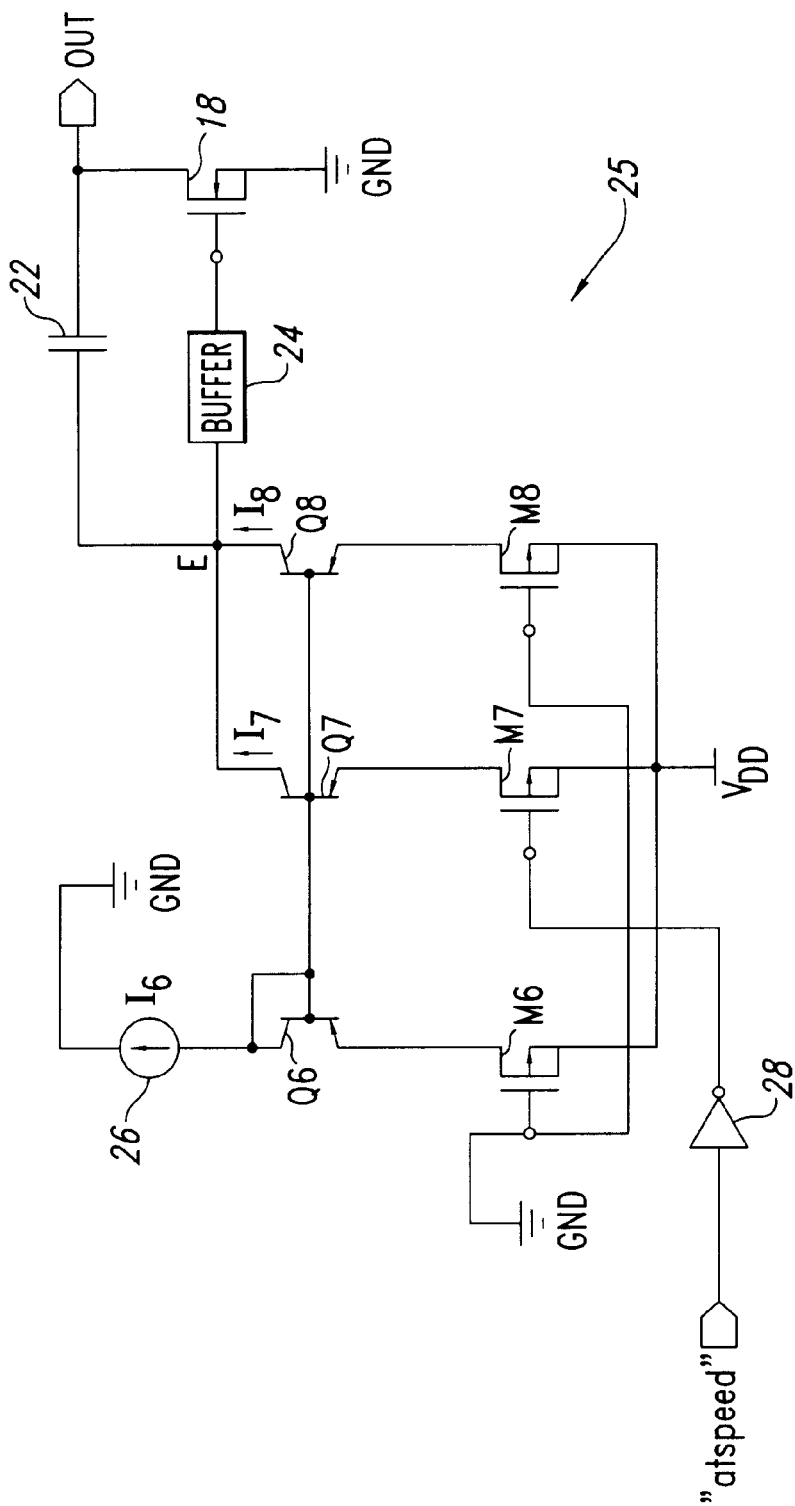
FIG. 3 is an electrical schematic diagram of a circuit for increasing a voltage applied to a control terminal of a low side driving transistor according to a second embodiment of the invention.

A control circuit 25 according to a second embodiment of the invention is shown in FIG. 3 which increases the voltage at the gate of the driving transistor 18. The control circuit 25 controls the slew rate when the driving transistor 18 is being switched ON in a manner similar to the way in which the control circuit 15 shown in FIG. 2 controls the slew rate when the driving transistor 18 is being switched OFF.

The control circuit 25 includes a current source 26 drawing a current $I_6$ connected between a collector of a PNP transistor Q6 and a ground voltage reference. An emitter of the transistor Q6 is connected to a drain of a p-channel MOS transistor M6. A base of the transistor Q6 is connected to the collector of the transistor Q6, a base of a PNP transistor Q7 and a base of a PNP transistor Q8. An emitter of the transistor Q7 is connected to a drain of a p-channel MOS transistor M7 and an emitter of the transistor Q8 is connected to a drain of a p-channel MOS transistor M8. A source of each of the transistors M6, M7, and M8 is connected to a voltage source VDD. A gate of the transistor M6 and a gate of the transistor M8 are both connected to the ground voltage reference. The "atspeed" control signal shown in FIG. 2 is connected to an input of an inverter 28, and an output of the inverter 28 is connected to a gate of the transistor M7. The transistors M6, M7, and M8 are switch transistors which control current through the transistors Q6, Q7, and Q8, respectively.

A collector of the transistor Q7 and a collector of the transistor Q8 are both connected to the node E which is also shown in FIG. 2. The buffer circuit 24, the capacitor 22, and the driving transistor 18 shown in FIG. 3 are identical in the corresponding portion of the circuit shown in FIG. 2. The node E is connected to the first plate of the capacitor 22 and to the input of the buffer circuit 24. The output of the buffer circuit 24 is connected to the gate of the low side driving transistor 18. The second plate of the capacitor 22 is connected to the output terminal OUT, which is also connected to the drain of the driving transistor 18. The source of the driving transistor 18 is connected to the ground voltage reference. The circuits shown in FIGS. 2 and 3 may be connected to the node E simultaneously to operate in concert to selectively raise and lower the voltage at the gate of the driving transistor 18.

The circuit shown in FIG. 3 raises the voltage at the gate of the driving transistor 18 in the following manner. The gates of each of the transistors M6 and M8 are connected to the ground voltage reference such that both of the transistors M6 and M8 are always in a conducting state. The gate of the transistor M7 is connected to the inverted "atspeed" control signal. Therefore, when the speed of the rotor is below a threshold speed, the "atspeed" control signal is low and the transistor M7 is switched OFF. When the speed of the rotor exceeds the threshold speed, the "atspeed" control signal is pulled high and the transistor M7 is switched ON which causes current to begin to flow through the transistors Q7 and M7.

The current source 26 draws a current $I_6$ from the voltage source VDD through the transistors M6 and Q6 to the ground voltage reference. The coupling between the transistors Q6 and Q8 forms a current mirror circuit which draws a current $I_8$ equal to the current $I_6$ from the voltage source VDD through the transistors M8 and Q8 to the node E. The current $I_8$ charges the first plate of the capacitor 22 which raises the voltage at the node E. The voltage at the gate of the driving transistor 18 is increased by the buffer circuit 24 as the voltage at the node E increases. As long as the speed of the rotor is below the threshold speed the "atspeed" control signal is low and the transistors M7 and Q7 are prevented from conducting current. As such, the voltage at the gate of the driving transistor 18 is increased according to the current $I_8$. As a result, the control circuit 25 provides a slew rate for the low side driving transistor 18 that is governed by the current $I_8$ when the rotor is rotating slowly.

As the speed of the rotor increases beyond the threshold speed, the "atspeed" control signal is shifted from a low to a high value which causes the transistor M7 to switch ON. Switching ON the transistor M7 allows a current $I_7$ to be supplied from the voltage source VDD through the transistors M7 and Q7 to the node E. The transistor Q7 is coupled to the transistor Q6 to form a second current mirror circuit when the transistor M7 is conducting. The current $I_7$ is equal to the current $I_6$ when the transistor M7 is switched ON. When the transistors M7 and M8 are both conducting, the transistors Q7 and Q8 supply the currents $I_7$ and $I_8$, respectively, to the capacitor 22 through the node E. The voltage at the gate of the driving transistor 18 is raised by the buffer circuit 24 according to the sum of the currents $I_7$ and $I_8$. The slew rate of the driving transistor 18 is thereby approximately doubled when the rotor speed exceeds the threshold speed and there is a moderate flow of current through the coils. In this way, the control circuit 25 controls the slew rate of the low side driving transistor in response to the speed of the rotor, and the slew rate is reduced during a period of high current recirculation through the coils.

In the circuit shown in FIG. 3, the dimensions of the transistors Q6, Q7, and Q8 are identical such that the currents $I_6$, $I_7$, and $I_8$ are equal when the transistor M7 is switched ON. In an alternative embodiment the transistors Q7 and Q8 may be sized differently such that the current $I_7$ would be either greater or lesser than the current $I_8$. The transistors Q6, Q7, and Q8 may be designed in such a way as to tailor the slew rate to match the characteristics of the motor.

Figure 4:
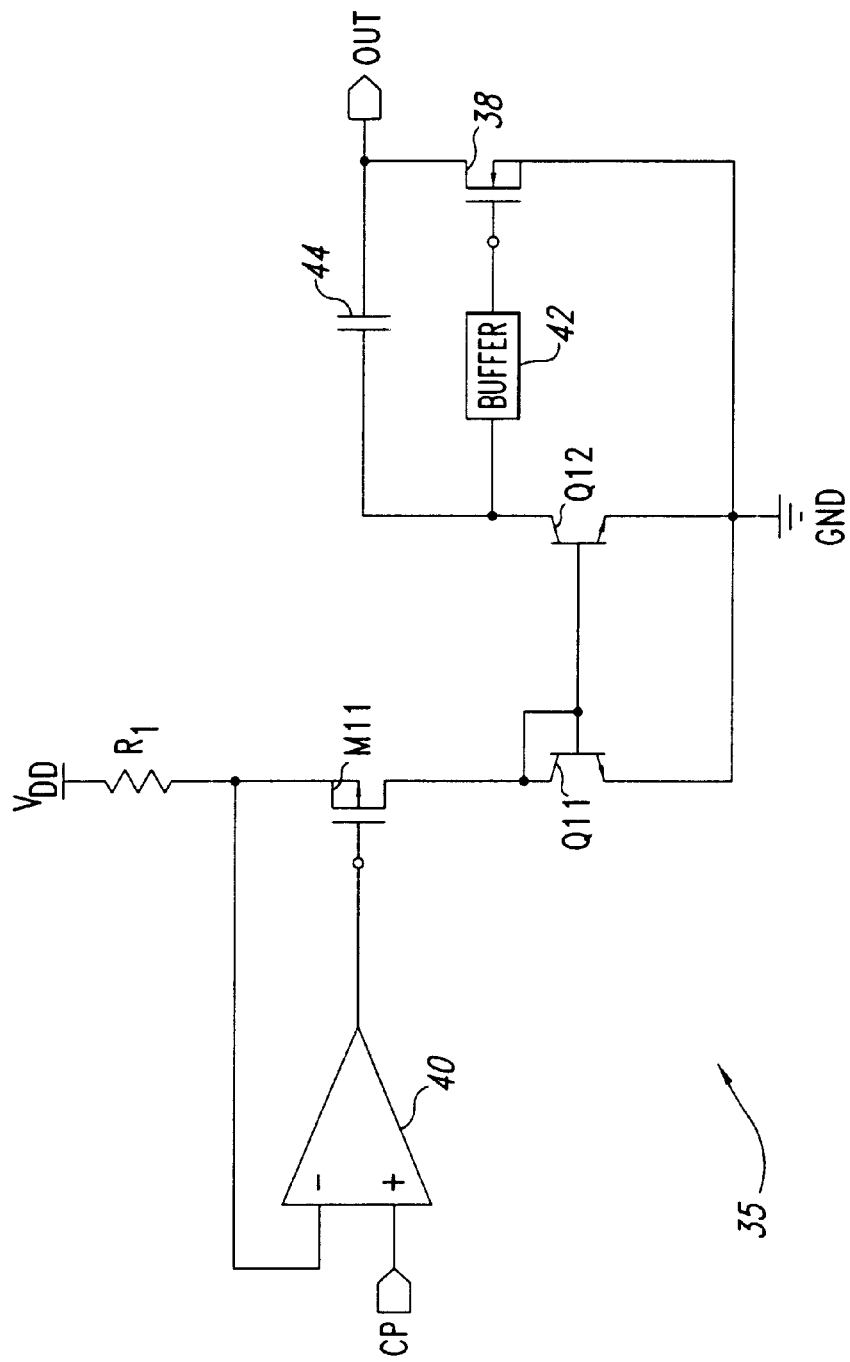
FIG. 4 is an electrical schematic diagram of a circuit for reducing a voltage applied to a control terminal of a low side driving transistor according to a third embodiment of the invention.

A control circuit 35 according to a third embodiment of the invention is shown in FIG. 4. The control circuit 35 employs an analog feedback method to adjust a slew rate of an n-channel DMOS low side driving transistor 38 in response to a control signal CP indicative of the speed of the rotor. The control circuit 35 includes an operational amplifier 40 having a non-inverting input, an inverting input, and an output. The non-inverting input receives the control signal CP from an output terminal of a charge pump circuit (not shown). The charge pump circuit is part of a conventional phase lock loop circuit (not shown) which regulates the speed of the rotor. The speed of the rotor is derived from the BEMF signal, and the phase lock loop circuit controls the speed by generating the control signal CP in a feedback manner. When the speed of the rotor is low, the control signal CP is high, and when the speed of the rotor is high, or near a desired speed, the control signal CP is low.

The output of the operational amplifier 40 is connected to a gate of a p-channel MOS transistor M11, and the inverting input of the operational amplifier 40 is connected to a source of the transistor M11. The source of the transistor M11 is also connected to a first end of a load resistor $R_1$, and a second end of the load resistor $R_1$, is connected to a voltage source VDD. A drain of the transistor M11 is connected to a collector and a base of an NPN transistor Q11. The collector and the base of the transistor Q11 are further connected to a base of an NPN transistor Q12. An emitter of the transistor Q11 and an emitter of the transistor Q12 are both connected to a ground voltage reference. A collector of the transistor Q12 is connected to an input of a buffer circuit 42 and to a first plate of a capacitor 44. A second plate of the capacitor 44 is connected to an output terminal OUT. An output of the buffer circuit 42 is connected to a gate of the driving transistor 38. A drain of the driving transistor 38 is connected to the terminal OUT, and a source of the driving transistor 38 is connected to the ground voltage reference. The buffer circuit 42, the capacitor 44, and the driving transistor 38 shown in FIG. 4 are identical to the corresponding elements shown in FIGS. 2 and 3. As described above, one end of one of the coils is connected to the terminal OUT such that current flows from the coil through the driving transistor 38 to the ground voltage reference when the driving transistor 38 is switched ON.

The operation of the control circuit 35 shown in FIG. 4 will now be described. The control signal CP, which is generally at a level between the voltage of the voltage source VDD and the ground voltage reference, governs the slew rate of the driving transistor 38 in the following manner. The operational amplifier 40 and the transistor M11 form a source follower circuit in which the control signal CP delivered at the non-inverting input terminal of the operational amplifier 40 is reproduced at the source of the transistor M11. The voltage difference between the voltage source VDD and the control signal CP drives a current across the load resistor $R_1$, through the transistor M11 and the transistor Q11 to the ground voltage reference. The transistors Q11 and Q12 are coupled in a current mirror configuration such that the current through the transistor Q11 is mirrored through the transistor Q12. As the current is drawn through the load resistor $R_1$, an equal current is drawn from the capacitor 44 through the transistor Q12 to the ground voltage reference. A voltage at the gate of the driving transistor 38 is reduced by the buffer circuit 42 according to a reduction in a voltage on the first plate of the capacitor 44 generated by the current drawn through the transistor Q12.

When the speed of the rotor is low and the control signal CP produced by the charge pump circuit is high, the voltage drop across the load resistor $R_1$ is small which results in a low current being drawn through the load resistor $R_1$ and the transistors R11 and Q11. An equally low current is drawn from the capacitor 44 through the transistor Q12 to the ground voltage reference. The voltage at the gate of the driving transistor 38 is therefore reduced by the output of the buffer circuit 42 according to a low current being drawn from the capacitor 44. The slew rate of the driving transistor 38 is thereby reduced when the speed of the rotor is low and the current recirculation through the coils is high.

In contrast, when the speed of the rotor is high, the control signal CP is low, which results in a large voltage drop across the load resistor $R_1$. The large voltage drop produces a high current through the load resistor $R_1$, the transistor M11, and the transistor Q11. The transistor Q12 draws an equivalently high current from the capacitor 44. The voltage at the gate of the driving transistor 38 is reduced by the output of the buffer circuit 42 according to a high current being drawn from the capacitor 44. As a result, the slew rate of the driving transistor 38 is increased when the speed of the motor is high. In this way, the control circuit 35 controls the slew rate of the low side driving transistor in response to the speed of the rotor, and the slew rate is reduced during a period of high current recirculation through the coils.

Figure 5:
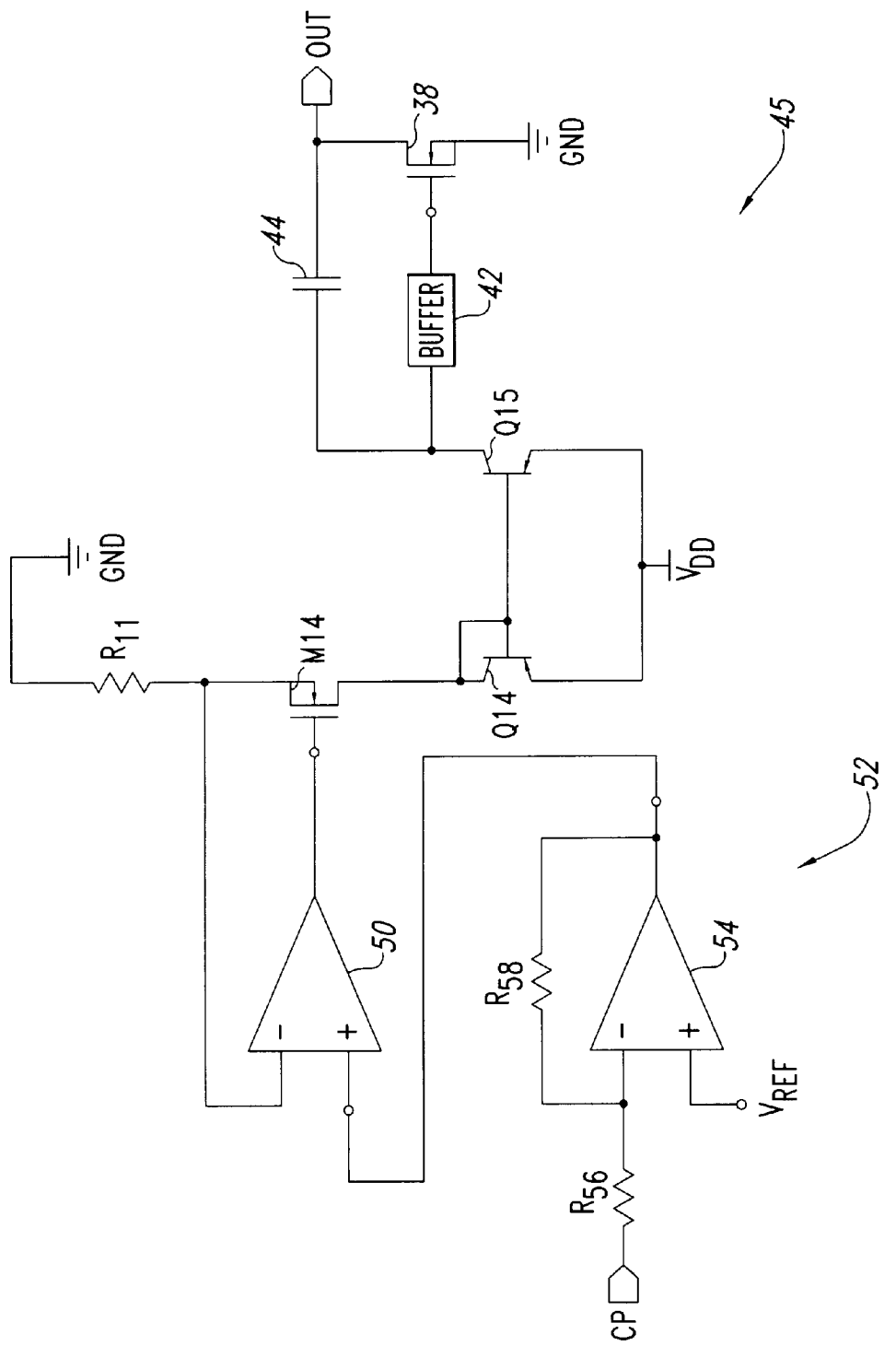
FIG. 5 is an electrical schematic diagram of a circuit for increasing a voltage applied to a control terminal of a low side driving transistor according to a fourth embodiment of the invention.

A control circuit 45 according to a fourth embodiment of the invention is shown in FIG. 5 which increases the voltage at the gate of the driving transistor 38. The control circuit 45 controls the slew rate when the driving transistor 38 is being switched ON in a manner similar to the way in which the control circuit 35 shown in FIG. 4 controls the slew rate when the driving transistor 38 is being switched OFF.

The control circuit 45 includes a first operational amplifier 50 having a non-inverting input, an inverting input, and an output. The non-inverting input is connected to an output of an inverter circuit 52, which inverts the control signal CP generated by the charge pump circuit described in conjunction with FIG. 4. The inverter circuit 52 is comprised of a second operational amplifier 54 and two resistors $R_{56}$ and $R_{58}$. The second operational amplifier 54 has an output, an inverting input and a non-inverting input connected to a reference voltage VREF. A first end of the resistor $R_{56}$ receives the control signal CP, and a second end of the resistor $R_{56}$ is connected to the inverting input of the second operational amplifier 54. The inverting input and the output of the second operational amplifier 54 are connected by a resistor $R_{58}$. The resistors $R_{56}$ and $R_{58}$ are equivalent such that the inverter circuit 54 provides a unity gain. The inverter circuit 52 inverts the control signal CP about the voltage VREF and delivers an inverted control signal CP to the non-inverting input of the first operational amplifier 50. As described above, the control signal CP is limited to a voltage level between the ground reference voltage and a voltage source VDD, and the voltage reference VREF is selected midway between these limits. The inversion of the control signal CP can best be described with the following example. In an embodiment of the invention, the voltage source VDD is 5 V, the ground reference voltage is 0 V, and the reference voltage VREF is selected to be 2.5 V. If the control signal CP is 4 V, then 1 V will be produced at the output of the second operational amplifier 54.

The output of the first operational amplifier 50 is connected to a gate of an n-channel MOS transistor M14, and the inverting input of the first operational amplifier 50 is connected to a source of the transistor M14. The source of the transistor M14 is also connected to a first end of a load resistor $R_{11}$, and a second end of the load resistor $R_{11}$ is connected to a ground voltage reference. A drain of the transistor M14 is connected to a collector and a base of a PNP transistor Q14. The collector and the base of the transistor Q14 are further connected to a base of a PNP transistor Q15. An emitter of the transistor Q14 and an emitter of the transistor Q15 are both connected to a voltage source VDD. The buffer circuit 42, the capacitor 44, and the driving transistor 38 shown in FIG. 5 are identical in the corresponding portion of the circuit shown in FIG. 4. A collector of the transistor Q15 is connected to the input of the buffer circuit 42 and to the first plate of the capacitor 44. The second plate of the capacitor 44 is connected to the output terminal OUT. The output of the buffer circuit 42 is connected to the gate of the driving transistor 38. The drain of the driving transistor 38 is connected to the terminal OUT, and the source of the driving transistor 38 is connected to the ground voltage reference. The circuits shown in FIGS. 4 and 5 may be connected to the buffer circuit 42 and the capacitor 44 simultaneously to operate in concert to increase and decrease the voltage on the gate of the driving transistor 38.

The operation of the circuit shown in FIG. 5 will now be described. The inverter circuit 52 inverts the control signal CP about the reference voltage VREF, and applies the inverted control signal CP to the non-inverting input of the first operational amplifier 50. The first operational amplifier 50 and the transistor M14 form a source follower circuit in which the inverted control signal CP is reproduced at the source of the transistor M14. The voltage difference between the source of the transistor M14 and the ground voltage reference draws a current from the voltage source VDD through the transistors Q14 and M14 and the load resistor $R_{11}$ to the ground voltage reference. The transistors Q14 and Q15 are coupled in a current mirror configuration such that, as the current is drawn through the transistor Q14, an identical current is drawn from the voltage source VDD through the transistor Q15 to the capacitor 44. The voltage at the gate of the driving transistor 38 is increased by the buffer circuit 42 according to the current delivered to the capacitor 44.

When the speed of the rotor is low and the control signal CP is high, the inverter circuit 52 supplies a low inverted control signal CP to the non-inverting input of the first operational amplifier 50. The low inverted control signal CP is in turn applied to the source of the transistor M14 resulting in a small voltage drop across the load resistor $R_{11}$ and a low current drawn through the transistor Q14. An equally low current is drawn from the voltage source VDD through the transistor Q15 to the capacitor 44. The voltage at the gate of the driving transistor 38 is increased by the buffer circuit 42 according to the low current delivered to the capacitor 44. The slew rate of the driving transistor 38 is thereby reduced when the speed of the rotor is low and the current recirculation through the coils is high.

In contrast, when the speed of the rotor is high, the control signal CP is low and the inverted control signal CP is high. As a result, there is a large voltage drop across the load resistor $R_{11}$ which draws a high current from the voltage source VDD through the transistors Q14 and M14, and the load resistor $R_{11}$. An equally high current is drawn from the voltage source VDD through the transistor Q15 to the capacitor 44. The voltage at the gate of the driving transistor 38 is increased by the buffer circuit 42 according to the current supplied to the capacitor 44. As a result, the slew rate of the driving transistor 38 is increased when the speed of the motor is high. In this way, the control circuit 45 controls the slew rate of the low side driving transistor in response to the speed of the rotor, and the slew rate is reduced during a period of high current recirculation through the coils.

Figure 6:
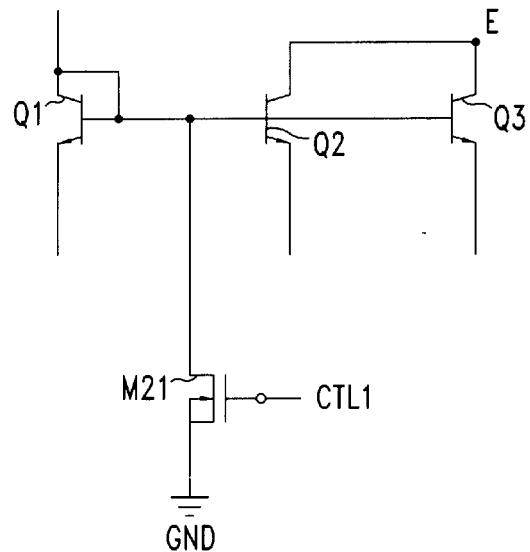
FIG. 6 is an electrical schematic diagram of a portion of the circuit shown in FIG. 2 including a control switch.

Each of the circuits shown in FIGS. 2–5 may be turned ON and OFF as needed to charge or discharge the gate of a low side driving transistor by a switch controlled by a digital control signal. A portion of the control circuit 15 shown in FIG. 2 is reproduced in FIG. 6 in which the bases of each of the transistors Q1, Q2, and Q3 are connected to a drain of an n-channel MOS transistor M21. A source of the transistor M21 is connected to a ground voltage reference. A gate of the transistor M21 receives a control signal CTL1 from a motor control logic circuit (not shown). If the control signal CTL1 is high the transistor M21 is in a conducting state, the bases of the transistors Q1, Q2, and Q3 are connected to the ground voltage reference which disables the control circuit 15 to prevent it from discharging the gate of the driving transistor 18. When the control signal CTL1 is low the transistor M21 is switched OFF and the control circuit 15 operates to discharge the gate of the driving transistor 18 as described above.

Figure 7:
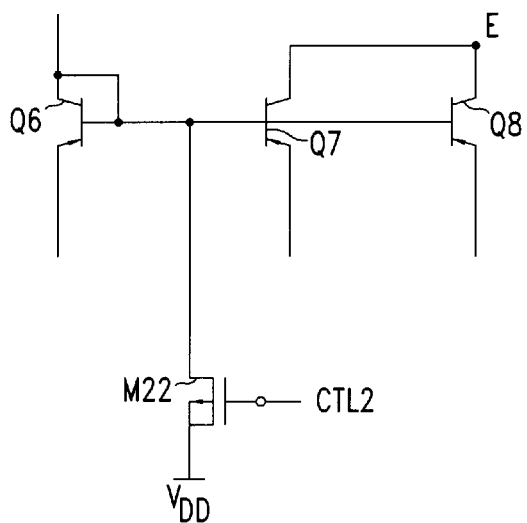
FIG. 7 is an electrical schematic diagram of a portion of the circuit shown in FIG. 3 including a control switch.

Similarly, a portion of the control circuit 25 shown in FIG. 3 is reproduced in FIG. 7. The bases of the transistors Q6, Q7, and Q8 are connected to a drain of a p-channel MOS transistor M22. A source of the transistor M22 is connected to the voltage source VDD, and a gate of the transistor M22 receives a control signal CTL2 from the motor control logic circuit. When the control signal CTL2 is low, the transistor M22 is in a conducting state and the bases of the transistors Q6, Q7, and Q8 are connected to the voltage source VDD, which disables the control circuit 25 to prevent it from charging the gate of the driving transistor 18. When the control signal CTL2 is high the transistor M22 is switched OFF and the control circuit 25 operates to charge the gate of the driving transistor 18 as described above.

Figure 8:
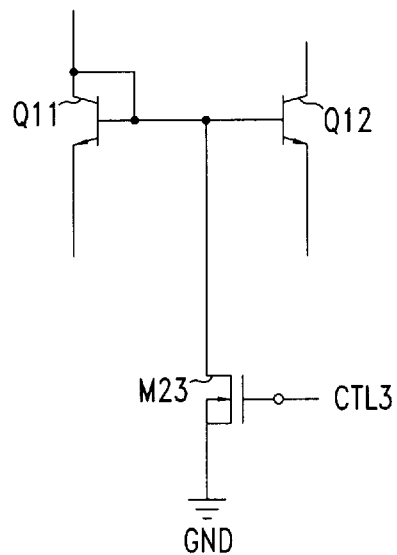
FIG. 8 is an electrical schematic diagram of a portion of the circuit shown in FIG. 4 including a control switch.

A portion of the control circuit 35 shown in FIG. 4 is reproduced in FIG. 8. The bases of each of the transistors Q11 and Q12 are connected to a drain of an n-channel MOS transistor M23. A source of the transistor M23 is connected to the ground voltage reference, and a gate of the transistor M23 receives a control signal CTL3 from the motor control logic circuit. When the control signal CTL3 is high the transistor M23 is in a conducting state and the bases of the transistors Q11 and Q12 are connected to the ground voltage reference, which disables the control circuit 35 to prevent it from discharging the gate of the driving transistor 38. When the control signal CTL3 is low the transistor M23 is switched OFF and the control circuit 35 operates to discharge the gate of the driving transistor 38 as described above.

Figure 9:
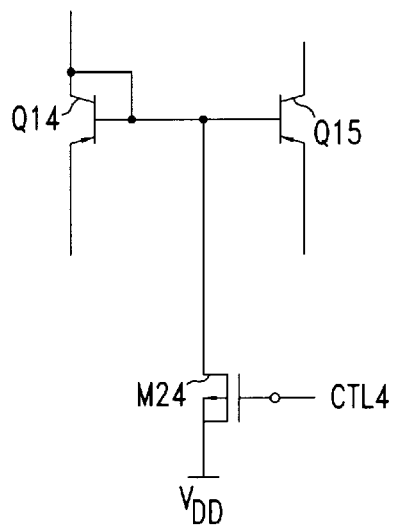
FIG. 9 is an electrical schematic diagram of a portion of the circuit shown in FIG. 5 including a control switch.

Finally, a portion of the control circuit 45 shown in FIG. 5 is reproduced in FIG. 9. A drain of a p-channel transistor M24 is connected to the bases of the transistors Q14 and Q15, and a source of the transistor M24 is connected to the voltage source VDD. A gate of the transistor M24 receives a control signal CTL4 from the motor control logic circuit. When the control signal CTL4 is low the transistor M24 is in a conducting state and the bases of the transistors Q14 and Q15 are connected to the voltage source VDD which disables the control circuit 45 to prevent it from charging the gate of the driving transistor 38. When the control signal CTL4 is high the transistor M24 is switched OFF and the control circuit 45 operates to charge the gate of the driving transistor 38 as described above.

The control signals CTL1, CTL2, CTL3, and CTL4 are employed by the motor control logic circuit to control the charging and discharging of the gates of a low side driving transistor during commutations in the three-phase DC motor. The control circuits shown in FIGS. 2–5 operate only when one of the low side driving transistors is being switched ON or OFF, and there are periods in which all of the control circuits are disabled.

When the three-phase DC motor is operating at low rotor speeds and there is high current recirculation through the "Y" connected coils the current through the coils is disturbed when any one of the high side or low side driving transistors changes state. The control circuits shown in FIGS. 2–5 may be employed to control the slew rate of either a high side driving transistor or a low side driving transistor in order to minimize the audible noise associated with changes in the current flow through the coils. Also, in an alternative embodiment the control circuits shown in FIGS. 2–5 may be connected directly to the gate of a driving transistor without the combination of a buffer circuit connected in parallel with a capacitor.

A method and a plurality of circuits for controlling the slew rate of a driving transistor have been described. In some instances, well-known circuits such as a motor control logic circuit, a sequencer circuit, and a phase lock loop circuit associated with three-phase DC motors have not been shown in detail in order not to unnecessarily obscure the invention. In addition, although several embodiments of the invention have been described above for purposes of illustration, various modifications may be made without deviating from the spirit and scope of the invention. For example, the present invention has been described as having a specific arrangement of BJT and MOS transistors. However, those skilled in the art will appreciate that the present invention could be practiced with an alternative arrangement of BJT and MOS transistors because the two types of transistors perform similar functions. In particular, the driving transistors could be BJT or p-channel DMOS transistors instead of the n-channel DMOS transistors disclosed. Similarly, the source follower circuit shown in FIGS. 4 and 5 may be constructed with a BJT transistor instead of a MOS transistor. Numerous variations are well within the scope of this invention. Accordingly, the invention is not limited except as by the appended claims.

I claim:

1. An adaptive slew rate control circuit for adjusting a slew rate of a driving transistor having a control terminal, the slew rate being controlled by a voltage applied to the driving transistor, the driving transistor being coupled to a polyphase DC motor rotating at a speed, the adaptive slew rate control circuit comprising:
   a current control circuit providing a first control current based on a control signal, the control signal being indicative of the speed of the motor; and
   a transfer circuit coupled to the current control circuit and to the control terminal of the driving transistor, the transfer circuit providing to the control terminal of the driving transistor a control voltage based on the first control current and adjusting the slew rate of the driving transistor based on the speed of the motors, wherein the slew rate varies between a first slew rate when the speed of the motor is below an "atspeed" threshold and a second slew rate greater than the first slew rate when the speed of the motor is greater than the "atspeed" threshold.

2. The adaptive slew rate control circuit of claim 1 wherein the current control circuit includes an impedance device having a first end coupled to a voltage source and a second end, the control signal being coupled to the second end of the impedance device to generate the first control current through the impedance device.

3. The adaptive slew rate control circuit of claim 2 wherein the current control circuit includes a source follower circuit, the control signal being connected to the source follower circuit, the source follower circuit being connected to the second end of the impedance device and applying the control signal to the second end of the impedance device.

4. The adaptive slew rate control circuit of claim 2 wherein the impedance device is a load resistor.

5. The adaptive slew rate control circuit of claim 1 wherein the transfer circuit includes a current mirror circuit being coupled to receive the first control current, the current mirror circuit generating a second control current, the transfer circuit translating the second control current into the control voltage and applying the control voltage to the control terminal of the driving transistor.

6. The adaptive slew rate control circuit of claim 5 wherein the current mirror circuit includes:
   a first transistor being connected between the current control circuit and a voltage source; and
   a second transistor being coupled between the first transistor and the control terminal of the driving transistor, the first control current being conducted through the first transistor, the second control current being conducted through the second transistor in response to the first control current.

7. The adaptive slew rate control circuit of claim 1 wherein the first control current is a negative current such that the transfer circuit reduces the control voltage provided to the control terminal of the driving transistor.

8. The adaptive slew rate control circuit of claim 1 wherein the current control circuit includes:
   a current source providing a source current;
   a first current mirror connected to the current source and the transfer circuit, the first current mirror receiving the control signal and generating the first control current in response to the control signal; and
   a second current mirror coupled to the current source and to the transfer circuit, the second current mirror generating a second control current;
   wherein the transfer circuit has an input node connected to the first current mirror and to the second current mirror, the transfer circuit adding the first control current and the second control current to provide the control voltage to the control terminal of the driving transistor.

9. The adaptive slew rate control circuit of claim 8 wherein:
   the first current mirror comprises a base transistor connected to the current source, the base transistor being connected to a first mirror transistor, the first mirror transistor being connected to the input node of the transfer circuit, the first mirror transistor generating the first control current;
   wherein the second current mirror comprises a second mirror transistor connected to the base transistor and to the input node of the transfer circuit; and
   wherein the transfer circuit includes a buffer circuit and a capacitor.

10. The adaptive slew rate control circuit of claim 1 wherein the transfer circuit includes a buffer circuit and a capacitor connected in parallel to the control terminal of the driving transistor, the control voltage being coupled to the control terminal of the driving transistor through the buffer circuit.

11. An adaptive slew rate control circuit for adjusting a slew rate of a driving transistor having a control terminal, the driving transistor being coupled to a polyphase DC motor rotating at a speed, the adaptive slew rate control circuit comprising:
   a current source providing a first current;
   a transfer circuit coupled to the control terminal of the driving transistor;
   a first current control circuit coupled between the current source and the transfer circuit, the first current control circuit producing a first control current, the first control current being proportional to the first current provided by the current source; and
   a second current control circuit coupled between the current source and the transfer circuit, the second current control circuit producing a second control current in response to a control signal, the control signal being indicative of the speed of the motor, the second control current being added to the first control current by the transfer circuit, the transfer circuit applying a control voltage to the control terminal of the driving transistor in response to the first control current and the second control current, wherein the slew rate varies between a first slew rate when the speed of the motor is below an "atspeed" threshold and a second slew rate greater than the first slew rate when the speed of the motor is greater than the "atspeed" threshold.

12. The adaptive slew rate control circuit of claim 11 wherein the first control current is proportional to the first current and the second control current is proportional to the first current.

13. The adaptive slew rate control circuit of claim 11 wherein the first current control circuit is comprised of:
   a first mirror transistor coupled between the current source and a voltage source; and
   a second mirror transistor coupled between the transfer circuit and the voltage source, the second mirror transistor being connected to the first mirror transistor, the second mirror transistor generating the first control current.

14. The adaptive slew rate control circuit of claim 13 wherein the second current control circuit comprises a third mirror transistor coupled between the transfer circuit and the voltage source, the control signal being coupled to the third mirror transistor, the third mirror transistor being connected to the first mirror transistor, the third mirror transistor generating the second control current in response to the control signal.

15. An adaptive slew rate control circuit for adjusting a slew rate of a driving transistor having a control terminal, the slew rate being controlled by a control voltage applied to the control terminal of the driving transistor, the driving transistor being coupled to a polyphase DC motor rotating at a speed, the adaptive slew rate control circuit comprising:

a current source receiving a control signal having a voltage, the control signal being indicative of the speed of the motor, the current source providing a first current proportional to the speed of the motor in response to the control signal; and a transfer circuit connected to the current source, the first current being conducted through the transfer circuit, the transfer circuit generating the control voltage, the control voltage being coupled to the control terminal of the driving transistor to adjust the slew rate of the driving transistors, wherein the slew rate varies between a first slew rate when the speed of the motor is below an "atspeed" threshold and a second slew rate greater than the first slew rate when the speed of the motor is greater than the "atspeed" threshold.

16. The adaptive slew rate control circuit of claim 15 wherein the transfer circuit includes a current mirror circuit, a buffer circuit, and a capacitor, the control voltage changing at a rate proportional to the first current.

17. The adaptive slew rate control circuit of claim 16 wherein the current source comprises:

a first operational amplifier having an inverting input, a non-inverting input, and an output, the non-inverting input being connected to the control signal;

a third transistor having a control terminal, a first terminal, and a second terminal, the control terminal of the third transistor being connected to the output of the first operational amplifier, the first terminal being connected to the inverting input of the first operational amplifier such that the voltage of the first terminal is coupled to the voltage of the control signal, and the second terminal being connected to the transfer circuit; and a load resistor connected between a voltage source and the first terminal.

18. The adaptive slew rate control circuit of claim 17, further comprising:

a voltage inverter circuit having an input and an output, the input of the voltage inverter circuit being connected to an inverted control signal, the output of the voltage inverter circuit being connected to the non-inverting input of the first operational amplifier.

19. A method for adjusting a slew rate of a driving transistor coupled to a polyphase DC motor rotating at a speed, the driving transistor having a control terminal, the method comprising the steps of:

generating a control signal having a voltage indicative of the speed of the motor;

generating a control current in response to the control signal;

translating the control current into a control voltage; and coupling the control voltage to the control terminal of the driving transistor whereby the slew rate of the driving transistor is adjusted by the control voltage such that the slew rate varies between a first slew rate when the speed of the motor is below an "atspeed" threshold and a second slew rate greater than the first slew rate when the speed of the motor is greater than the "atspeed" threshold.

20. The method of claim 19 wherein the step of translating the control current into a control voltage comprises the step of:

directing the control current to a first plate of a capacitor having a voltage.

21. The method of claim 19 wherein the step of generating a control current comprises the steps of:

applying the control signal to a first end of an impedance; and connecting a second end of the impedance to a first voltage source.

22. The method of claim 19 wherein the step of generating a control current comprises the steps of:

generating a first current in response to the control signal;

passing the first current through a first mirror transistor;

coupling the first mirror transistor to a second mirror transistor; and generating the control current in the second mirror transistor.

23. The method of claim 20 wherein the step of coupling the control voltage comprises the steps of:

connecting the first plate of the capacitor to a buffer circuit; and connecting the buffer circuit to the control terminal of the driving transistor.

24. The method of claim 19 wherein the step of generating a control current comprises the steps of:

generating a first current; and generating a control current in response to the control signal, the control current being proportional to the first current.

25. The method of claim 24 wherein the step of generating a control current comprises the steps of:

conducting the first current through a first mirror transistor;

coupling the first mirror transistor to a second mirror transistor;

generating a first control current in the second mirror transistor;

coupling the first mirror transistor to a third mirror transistor;

selectively switching the third mirror transistor to a conducting state in response to the control signal;

generating a second control current in the third mirror transistor when the third mirror transistor is in a conducting state; and combining the first control current and the second control current to generate the control current.

26. The adaptive slew rate control circuit of claim 1 wherein the slew rate varies in proportion to the speed of the motor.

27. The adaptive slew rate control circuit of claim 1 wherein a first slew rate when the speed of the motor is below the "atspeed" threshold is approximately one-half of a second slew rate when the speed of the motor is above the "atspeed" threshold.

28. The adaptive slew rate control circuit of claim 11, wherein, when the speed of the motor is less than the "atspeed" threshold, the second current control circuit does not provide a current to the transfer circuit, and, when the speed of the motor is greater than the "atspeed" threshold, the second control circuit does provide a current to the transfer circuit.

29. The adaptive slew rate control circuit of claim 11, wherein, when the speed of the motor is less than the "atspeed" threshold, current coupled between the first and second current control circuits and the transfer circuit has a first value, and when the speed of the motor is greater than the "atspeed" threshold, the current coupled between the first and second current control circuits and the transfer circuit has a second value that is approximately twice the first value.

30. An adaptive slew rate control circuit for adjusting a slew rate of a driving transistor having a control terminal, the slew rate being controlled by a control voltage applied to the control terminal of the driving transistor, the driving transistor being coupled to a polyphase DC motor rotating at a speed, the adaptive slew rate control circuit comprising:

a current source receiving a control signal having a voltage indicative of the speed of the motor, the current source providing a first current proportional to the speed of the motor in response to the control signal; and a transfer circuit connected to the current source, the first current being conducted through the transfer circuit, the transfer circuit generating the control voltage, the control voltage changing at a rate proportional to the first current, the control voltage being coupled to the control terminal of the driving transistor to adjust the slew rate of the driving transistor, wherein the slew rate varies between a first slew rate when the speed of the motor is below an "atspeed" threshold and a second slew rate greater than the first slew rate when the speed of the motor is greater than the "atspeed" threshold.

* * * * *